Figure 1:
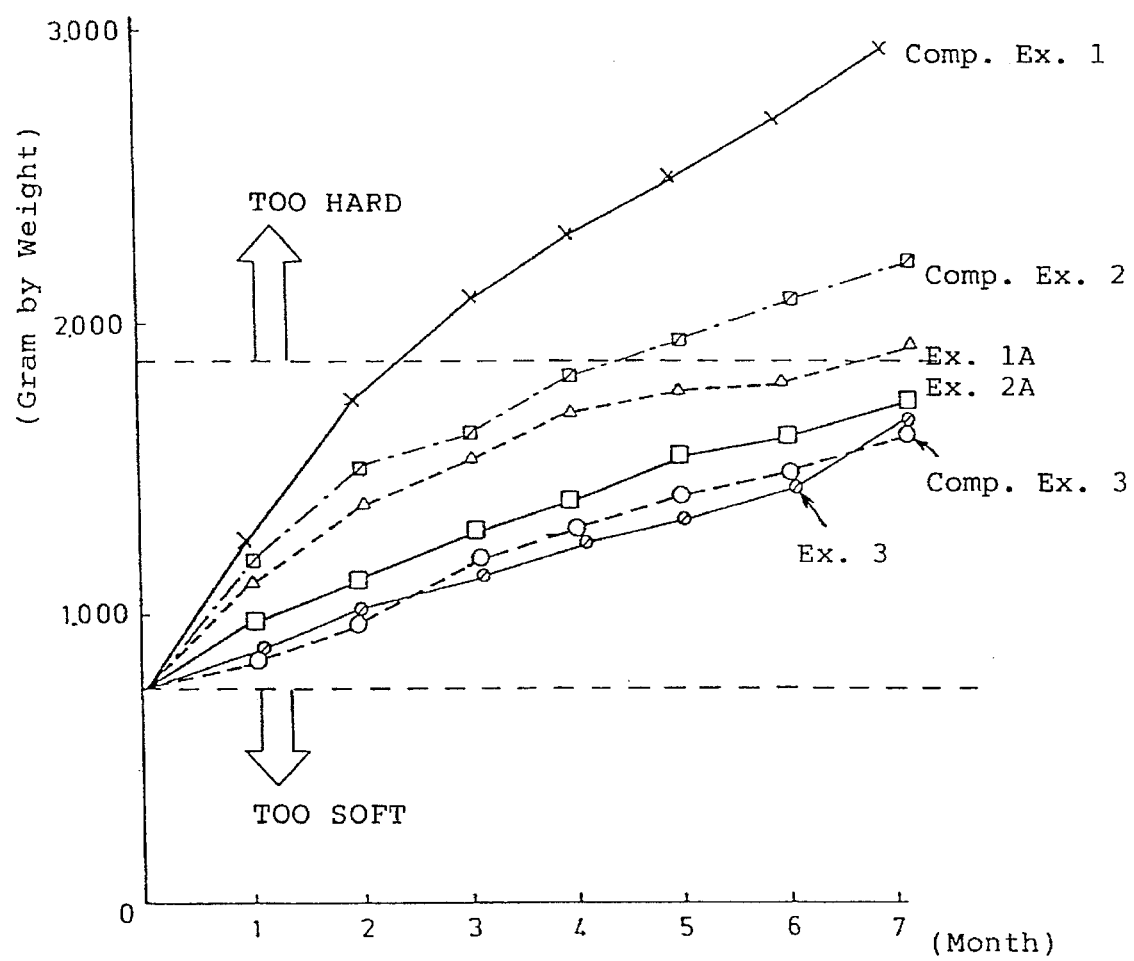

United States Patent [19]

Takemori et al.

[11] Patent Number: 5,629,040
[45] Date of Patent: May 13, 1997

[54] LOW CALORIE CHOCOLATE

[75] Inventors: Toshio Takemori, Tokyo; Toshinobu Tsurumi, Saitama; Masanori Ito, Saitama; Tatsuya Kamiwaki, Saitama, all of Japan

[73] Assignee: Lotte Co., Ltd., Tokyo, Japan

[21] Appl. No.: 339,270

[22] Filed: Nov. 10, 1994

[30] Foreign Application Priority Data

Nov. 10, 1993 [JP] Japan ................................. 5-281433

[51] Int. Cl.⁶ ................................................. A23G 1/00
[52] U.S. Cl. ................................................. 426/548; 426/660
[58] Field of Search ................................. 426/548, 660

[56] References Cited

U.S. PATENT DOCUMENTS 4,810,516  3/1989  Kong-Chan ............................ 426/548
4,980,189  12/1990  Keme .................................... 426/659
5,360,621  11/1994  Mentink ................................ 426/548

OTHER PUBLICATIONS

Minifie 1980 "Chocolate, Cocoa and Confectionery" Science and Technology 2nd edition AVI Publishing Co. Westport CT pp. 89–104, 125–127, 323–324.

*Primary Examiner*—Carolyn Paden
*Attorney, Agent, or Firm*—Young & Thompson

[57] ABSTRACT

A chocolate includes a glucide that comprises a hydrogenated isomaltulose and a sugar showing a hygroscopic property and an emulsifying agent that comprises a lecithin and any of lipophilic emulsifying agents except for the lecithin. The chocolate may further includes at least one selected from the group consisting of calcium salts, calcium containing materials, magnesium salts and magnesium containing materials.

20 Claims, 1 Drawing Sheet

LOW CALORIE CHOCOLATE

BACKGROUND OF THE INVENTION

The invention relates to a low calorie chocolate, and more particularly to a chocolate having improved softness and pleasantness with a lowered calorie.

It has been well known in the art that calcium and magnesium have functions to suppress an internal absorption of a cocoa butter that may be used as oils and fats of chocolates. When, however, the cocoa butter contained in the chocolate is absorbed, it has been still unclear whether calcium and magnesium are capable of displaying an appreciable degree of the function for suppressing the internal absorption of the cocoa butter.

Recently, in place of sugars, developments of various sweeteners that are commercially available have been a great success. A hydrogenated isomaltulose has been known as one of low calorie sweeteners. The hydrogenated isomaltulose comprises a mol-equivalent mixture of isomers, for example, alpha-D-glucopyranosil-1, 6-mannitol (GPM) and alpha-D-glucopyranosil-1, 6-glucitol (GPG). The hydrogenated isomaltulose is commercially available in the name of "PALATINIT" as a registered trademark. The hydrogenated isomaltulose exhibits a low efficiency in conversion into energy and an anticarious function that is useful to prevent teeth from decaying. It is disclosed in the Japanese laid-open patent application No. 5-260894 to add chocolates with the hydrogenated isomaltulose as a sweetener.

However, the hydrogenated isomaltulose also has disadvantages as described below. Chocolates containing the hydrogenated isomaltulose become tough increasingly as a time passes. Some of the Japanese peoples who had absorbed the chocolates containing the hydrogenated isomaltulose show symptoms of diarrhea.

SUMMARY OF THE INVENTION

Accordingly, it is a primary object of the present invention to provide an improved low calorie chocolate free from any of the disadvantages as described above.

It is a further object of the present invention to provide an improved low calorie chocolate having good taste and flavor.

It is a still further object of the present invention to provide an improved low calorie chocolate having a sufficient durability in good softness and pleasantness.

The above and other objects, features and advantages of the present invention will be apparent from the following descriptions.

The present invention provides a low calorie chocolate showing improved softness and pleasantness wherein a glucide comprises a hydrogenated isomaltulose and a sugar showing a high hygroscopic property and wherein an emulsifying agent comprises a lecithin and any of lipophilic emulsifying agents except for the lecithin.

The present invention also provides a low calorie chocolate showing improved softness and pleasantness wherein a glucide comprises a hydrogenated isomaltulose and a sugar showing a high hygroscopic property and wherein oil and fats comprise a cacao fat, at least any one of substitutes for the cacao fat and a milk fat and/or a liquid vegetable oil and fat and also wherein an emulsifying agent is used.

The present invention also provides a low calorie chocolate showing improved softness and pleasantness wherein a glucide comprises a hydrogenated isomaltulose and a sugar showing a high hygroscopic property and wherein oil and fats comprise a cacao fat, at least any one of substitutes for the cacao fat and a milk fat and/or a liquid vegetable oil and fat and also wherein an emulsifying agent comprises a lecithin and any of lipophilic emulsifying agents except for the lecithin.

The low calorie chocolate according to the present invention may further includes at least any one selected from the group consisting of calcium salts, calcium containing materials, magnesium salts and magnesium containing materials.

BRIEF DESCRIPTIONS OF THE DRAWINGS

Preferred embodiments of the present invention will hereinafter fully be described in detail with reference to the accompanying drawings.

FIG. 1 is a diagram illustrative of successive variations by time-passing in hardness between both chocolates of the present invention and the prior art.

DESCRIPTIONS OF THE INVENTION

The present invention provides a low calorie chocolate showing improved softness and pleasantness wherein a glucide comprises a hydrogenated isomaltulose and a sugar showing a high hygroscopic property and wherein an emulsifying agent comprises a lecithin and any of lipophilic emulsifying agents except for the lecithin.

The present invention also provides a low calorie chocolate showing improved softness and pleasantness wherein a glucide comprises a hydrogenated isomaltulose and a sugar showing a high hygroscopic property and wherein oil and fats comprise a cacao fat, at least any one of substitutes for the cacao fat and a milk fat and/or a liquid vegetable oil and fat and also wherein an emulsifying agent is used.

The present invention also provides a low calorie chocolate showing improved softness and pleasantness wherein a glucide comprises a hydrogenated isomaltulose and a sugar showing a high hygroscopic property and wherein oil and fats comprise a cacao fat, at least any one of substitutes for the cacao fat and a milk fat and/or a liquid vegetable oil and fat and also wherein an emulsifying agent comprises a lecithin and any of lipophilic emulsifying agents except for the lecithin.

The low calorie chocolate according to the present invention may further include at least any one selected from the group consisting of calcium salts, calcium containing materials, magnesium salts and magnesium containing materials.

The high hygroscopic sugar may be selected from the group consisting of sugar alcohols such as sorbitol or maltitol, oligosaccharides such as soybean oligosaccharide and xylooligosaccharide, and dietary fibers such as polydextrose and hard digestive dextrin.

The calcium containing materials may be selected from the group consisting of powdered eggshell, powdered whey, powdered oyster-shell, powdered pearl, powdered beef bone, powdered bonito bone and combinations thereof. Alternatively, magnesium chloride and the like are available as the magnesium containing material.

A ratio of the hydrogenated isomaltulose to the high hygroscopic sugar is preferably in the range of from 1:0.3 to 1:3, and more preferably in the range of from 1:0.5 to 1:2.

When the hydrogenated isomaltulose is used together with the high hygroscopic sugar alcohol, an amount of the sugar alcohol is preferably not more than 40%, and more preferably not more than 25%.

When the hydrogenated isomaltulose is used together with the high hygroscopic oligosaccharides, an amount of the oligosaccharides is preferably in the range of from 0.5% to 10%, and more preferably not more than 5%.

It is preferable to use fats such as fresh cream, butters, margarines, cone oils, olive oils and rape oils, that have a SFI value not less than 30 at 20° C. In this case, it is preferable to add 5% of the fat component at the maximum.

Lecithin, sugar ester, glycerin fatty acid ester and polyglycerin condensed ricinoleic acid ester and the like are available as the emulsifying agent. In this case, it is preferable to add an amount not more than 0.6% of the emulsifying agent including 0.2 to 0.4% of the lecithin and 0.05 to 0.3% of the emulsifying agent except for the lecithin.

According to the present invention, the glucide may comprise a combination of the hydrogenated isomaltulose and the high hygroscopic sugar and the emulsifying agent may comprise the lecithin and the lipophilic emulsifying agents except for the lecithin so that the low calorie chocolate may show good softness and pleasantness.

The high hygroscopic sugar may be sugar alcohols such as sorbitol or maltitol, oligosaccharides such as soybean oligosaccharide, xylooligosaccharide and fractoligosaccharide, and dietary fibers such as polydextrose, hard digestive dextrin and guargam decompozate. Further, powdered thick malt and other materials are available provided that the calorie is in the predetermined range thereof.

As described above, the ratio of the hydrogenated isomaltulose to the high hygroscopic sugar is preferably in the range of from 1:0.3 to 1:3, and more preferably in the range of from 1:0.5 to 1:2. If the amount of the hydrogenated isomaltulose is over the above available range, then the chocolate shows a coagulation as a time passes. By contrast, if the amount of the high hygroscopic sugar is over the above available range, then the chocolate shows a muddy smell and a stickiness without good softness and pleasantness.

As described above, the hydrogenated isomaltulose may be used together with the high hygroscopic sugar alcohol in which an amount of the sugar alcohol is preferably not more than 40%, and more preferably not more than 25%. If the amount of the oligosaccharides is over the above available range, then the chocolate has a disadvantage in an excess high viscosity due to high hygroscopic degree of the oligosaccharides.

Various fat materials are useful to adjust the hardness of the chocolate, however, it is preferable to use powdered or condensed fresh cream, butters, margarines, cone oils, olive oils and rape oils, that have a SFI value not less than 30 at 20° C., provided that the fat is limited within 5% to prevent high calorie.

Lecithin, sugar ester, glycerin fatty acid ester and polyglycerin condensed ricinoleic acid ester and the like are available as the emulsifying agent. It is preferable to use the lecithin together with the lipophilic emulsifying agents such as sugar ester and polyglycerin condensed ricinoleic acid ester (PGPR) that have a HLB value not more than 6. In this case, it is preferable to add an amount of the emulsifying agent in the range from 0.3 to 0.55% in which the lecithin is in the range of from 0.25 to 0.35% and the emulsifying agent except for the lecithin is in the range from 0.15 to 0.3%.

As described above, calcium and magnesium are useful to suppress absorptivities of the cocoa butter and substitutes therefor. It is preferable that a molar ratio of either calcium or magnesium to the cacao butters and those substitute is in the range from 1:2 to 2:1. If the amount of calcium or magnesium is under the above available range, then a bonding strength between either calcium or magnesium and the cacao butters is insufficient. By contrast, if the amount of calcium or magnesium is over the above available range, then the taste and flavor of the chocolate would be bad as well as an excess amount of the mineral is included in the chocolate.

Consequently, use of the hydrogenated isomalutose together with the high hygroscopic sugar as the glucide may prevent the chocolate to be harden so that the chocolate may keep a low calorie but cause no diarrhea. Also the use of the lecithin together with the fat material for adjusting the hardness of the chocolate may improve the softness and the pleasantness. Also the use of calcium or magnesium in the chocolate may suppress the absorption of the fat component such as the cacao butter to realize a low calorie chocolate. The chocolate of the present invention has good taste and sufficient softness and pleasantness.

EXAMPLES

Example 1A

| | |
|---|---|
| Cacao Mass | 18.0% |
| Whole Powdered Milk | 20.0% |
| Cacao Butter | 18.8% |
| Hydrogenated isomaltulose | 23.0% |
| Polydextrose | 19.5% |
| Aspartame | 0.2% |
| Lecithin | 0.2% |
| polyglycerin condensed-ricinoleic acid ester (PGPR) | 0.2% |
| Vanilla Essence | 0.1% |
| TOTAL | 100.0% |

In Example 1A, the hydrogenated isomaltulose and the polydextrose were used as the glucide, while the lecithin and the polyglycerin condensed ricinoleic acid ester (PGPR) were used as the emulsifying agent. The above components were processed by the normal methods comprising the steps of conching, tempering, forming and cooling to thereby produce the chocolate.

Example 1B

| | |
|---|---|
| Cacao Mass | 18.0% |
| Whole Powdered Milk | 20.0% |
| Cacao Butter | 18.8% |
| Hydrogenated Isomaltulose | 23.0% |
| Polydextrose | 19.5% |
| Aspartame | 0.2% |
| Lecithin | 0.2% |
| sugar ester | 0.2% |
| Vanilla Essence | 0.1% |
| TOTAL | 100.0% |

In Example 1B, the hydrogenated isomaltulose and the polydextrose were used as the glucide, while the lecithin and the sugar ester were used as the emulsifying agent. The above components were processed by the normal methods comprising the steps of conching, tempering, forming and cooling to thereby produce the chocolate.

Example 2A

| | |
|---|---|
| Cacao Mass | 18.0% |
| Whole Powdered Milk | 20.0% |
| Cacao Butter | 15.3% |
| Refined Rape Oil | 3.5% |
| Hydrogenated isomaltulose | 23.0% |
| Polydextrose | 19.5% |
| Aspartame | 0.2% |
| Lecithin | 0.4% |
| Vanilla Essence | 0.1% |
| TOTAL | 100.0% |

In Example 2A, the hydrogenated isomaltulose and the polydextrose were used as the glucide, while the lecithin was used as the emulsifying agent. Further, the refined rape oil was used as the liquid vegetable oil and fat. The above components were processed by the normal methods comprising the steps of conching, tempering, forming and cooling to thereby produce the chocolate.

Example 2B

| | |
|---|---|
| Cacao Mass | 18.0% |
| Whole Powdered Milk | 20.0% |
| Cacao Butter | 13.8% |
| Powdered Fresh Cream | 5.0% |
| Hydrogenated isomaltulose | 23.0% |
| Polydextrose | 19.5% |
| Aspartame | 0.2% |
| Lecithin | 0.4% |
| Vanilla Essence | 0.1% |
| TOTAL | 100.0% |

In Example 2B, the hydrogenated isomaltulose and the polydextrose were used as the glucide, while the lecithin was used as the emulsifying agent. Further, the powdered fresh cream was used as the oil and fat. The above components were processed by the normal methods comprising the steps of conching, tempering, forming and cooling to thereby produce the chocolate.

Example 3

| | |
|---|---|
| Cacao Mass | 18.0% |
| Whole Powdered Milk | 20.0% |
| Cacao Butter | 15.3% |
| Refined Rape Oil | 3.5% |
| Hydrogenated isomaltulose | 23.0% |
| Polydextrose | 19.5% |
| Aspartame | 0.2% |
| Lecithin | 0.2% |
| polyglycerin condensed-ricinoleic acid ester (PGPR) | 0.2% |
| Vanilla Essence | 0.1% |
| TOTAL | 100.0% |

In Example 3, the hydrogenated isomaltulose and the polydextrose were used as the glucide, while the lecithin and polyglycerin condensed ricinoleic acid ester were used as the emulsifying agent. Further, the refined rape oil was used as the liquid vegetable oil and fat. The above components were processed by the normal methods comprising the steps of conching, tempering, forming and cooling to thereby produce the chocolate.

Example 4

| | |
|---|---|
| Cacao Mass | 18.0% |
| Whole Powdered Milk | 20.0% |
| Cacao Butter | 15.3% |
| Refined Rape Oil | 3.5% |
| Hydrogenated isomaltulose | 20.0% |
| Polydextrose | 17.5% |
| Aspartame | 0.2% |
| Lecithin | 0.2% |
| polyglycerin condensed-ricinoleic acid ester (PGPR) | 0.2% |
| Vanilla Essence | 0.1% |
| Powdered eggshell | 5.0% |
| TOTAL | 100.0% |

In Example 4, the hydrogenated isomaltulose and the polydextrose were used as the glucide, while the lecithin and polyglycerin condensed ricinoleic acid ester were used as the emulsifying agent. Further, the refined rape oil was used as the liquid vegetable oil and fat. Moreover, the powdered eggshell was added. The above components were processed by the normal methods comprising the steps of conching, tempering, forming and cooling to thereby produce the chocolate.

Example 5

| | |
|---|---|
| Cacao Mass | 18.0% |
| Whole Powdered Milk | 20.0% |
| Cacao Butter | 15.3% |
| Refined Rape Oil | 3.5% |
| Hydrogenated isomaltulose | 21.3% |
| Polydextrose | 7.0% |
| Erythritol | 9.0% |
| Powdered Xyloolygosugar | 4.0 |
| Aspartame | 0.2% |
| Lecithin | 0.2% |
| polyglycerin condensed-ricinoleic acid ester (PGPR) | 0.2% |
| Vanilla Essence | 0.1% |
| Magnesium Carbonate | 1.2% |
| TOTAL | 100.0% |

In Example 5, the hydrogenated isomaltulose, the polydextrose and the powdered xyloolygosugar were were used as the glucide, while the lecithin and polyglycerin condensed ricinoleic acid ester were used as the emulsifying agent. Further, the refined rape oil was used as the liquid vegetable oil and fat. Moreover, magnesium carbonate was added. The above components were processed by the normal methods comprising the steps of conching, tempering, forming and cooling to thereby produce the chocolate.

Example 6

| | |
|---|---|
| Cacao Mass | 18.0% |
| Whole Powdered Milk | 20.0% |
| Cocoa Butter | 15.3% |
| Refined Rape Oil | 3.5% |
| Hydrogenated isomaltulose | 20.0% |
| Polydextrose | 7.0% |
| Erythritol | 9.0% |
| Powdered Xyloolygosugar | 4.0 |
| Aspartame | 0.2% |
| Lecithin | 0.2% |
| polyglycerin condensed- | 0.2% |

| | |
|---|---|
| ricinoleic acid ester (PGPR) | |
| Vanilla Essence | 0.1% |
| Powdered eggshell | 2.0% |
| Magnesium Carbonate | 0.5% |
| TOTAL | 100.0% |

In Example 6, the hydrogenated isomaltulose, the polydextrose and the powdered xyloolygosugar were used as the glucide, while the lecithin and polyglycerin condensed ricinoleic acid ester were used as the emulsifying agent. Further, the refined rape oil was used as the liquid vegetable oil and fat. Moreover, the powdered eggshell and magnesium carbonate were added. The above components were processed by the normal methods comprising the steps of conching, tempering, forming and cooling to thereby produce the chocolate.

Comparative Example 1

| | |
|---|---|
| Cacao Mass | 18.0% |
| Whole Powdered Milk | 20.0% |
| Cacao Butter | 18.8% |
| Hydrogenated isomaltulose | 42.5% |
| Polydextrose | — |
| Aspartame | 0.2% |
| Lecithin | 0.4% |
| Vanilla Essence | 0.1% |
| TOTAL | 100.0% |

In Comparative Example 1, the hydrogenated isomaltulose only was used as the glucide, while the lecithin only was used as the emulsifying agent. The above components were processed by the normal methods comprising the steps of conching, tempering, forming and cooling to thereby produce the chocolate.

Comparative Example 2

| | |
|---|---|
| Cacao Mass | 18.0% |
| Whole Powdered Milk | 20.0% |
| Cacao Butter | 18.8% |
| Hydrogenated isomaltulose | 23.0% |
| Polydextrose | 19.5% |
| Aspartame | 0.2% |
| Lecithin | 0.4% |
| Vanilla Essence | 0.1% |
| TOTAL | 100.0% |

In Comparative Example 2, the hydrogenated isomaltulose and polydextrose were used as the glucide, while the lecithin only was used as the emulsifying agent. The above components were processed by the normal methods comprising the steps of conching, tempering, forming and cooling to thereby produce the chocolate.

Comparative Example 3

| | |
|---|---|
| Cacao Mass | 18.0% |
| Whole Powdered Milk | 20.0% |
| Cacao Butter | 19.0% |
| Sugar | 42.5% |
| Lecithin | 0.4% |
| Vanilla Essence | 0.1% |
| TOTAL | 100.0% |

In Comparative Example 3, the sugar was used as the glucide, while the lecithin was used as the emulsifying agent. The above components were processed by the normal methods comprising the steps of conching, tempering, forming and cooling to thereby produce the chocolate.

ORGANOLEPTIC TEST

An organolephic test was made by panelists as specialist in sensing various feelings of chocolate in mouth such as rigidity, melting and softness. For example, ten of the panelists sampled three kinds of the chocolates par a day so that all kinds of the chocolates were sampled for three days for marking thereof. The all kinds of the chocolates were sampled in random sequences for every panelists to prevent the panelist's feeling from suffering any influence due to the sampling sequence.

Results of the marks by the panelists are listed on Table 1.

TABLE 1

| | Results of the organoleptic test | | | | | | | | | | |
|---|---|---|---|---|---|---|---|---|---|---|---|
| Panelist | 1 | 2 | 3 | 4 | 5 | 6 | 7 | 8 | 9 | 10 | Total |
| Example 1A | 4 | 4 | 4 | 5 | 3 | 4 | 4 | 5 | 4 | 4 | 41 |
| Example 1B | 4 | 4 | 5 | 4 | 3 | 4 | 4 | 5 | 4 | 4 | 41 |
| Example 2A | 4 | 5 | 5 | 5 | 4 | 4 | 5 | 5 | 4 | 5 | 46 |
| Example 2B | 4 | 5 | 5 | 5 | 4 | 4 | 5 | 5 | 4 | 4 | 45 |
| Example 3 | 5 | 5 | 5 | 5 | 5 | 4 | 5 | 5 | 5 | 5 | 49 |
| Example 4 | 5 | 5 | 5 | 5 | 5 | 4 | 5 | 5 | 4 | 5 | 48 |
| Comp.Ex. 1 | 1 | 2 | 1 | 2 | 1 | 1 | 2 | 2 | 1 | 1 | 14 |
| Comp.Ex. 2 | 2 | 3 | 2 | 3 | 2 | 2 | 3 | 3 | 2 | 2 | 24 |
| Comp.Ex. 3 | 5 | 5 | 5 | 5 | 3 | 4 | 5 | 5 | 4 | 4 | 45 |

1: Feeling of strong rigidity, poor melting ability in the mouth and none of softness.
2: Feeling of slight rigidity and none of softness of chocolate.
3: Feeling of almost no rigidity and no softness.
4: Feeling of no rigidity and a softness of chocolate.
5: Feeling of sufficient melting in the mouth, creamy and softness.

From the above results of the organolephic test, it could be appreciated that the chocolates of any examples of the present invention have rich taste and rich flavor rather than the chocolates of the comparative examples 1 and 2. Namely, the chocolates of the present invention were improved in the softness and the pleasantness.

a. Improvement in softness and pleasantness by use of emulsifying agent:

The chocolate using the hydrogenated isomalulose showed an increase of hardness as a time passes as compared to the chocolates using sugar.

The chocolate was improved in the softness and pleasantness by use of the emulsifying agent. From the results of the examples 1 and 2, the followings could be appreciated. Under the condition for use of the hydrogenated isomalulose, the use of the combination of the lecithin with either the polyglycerin condensed ricinoleic acid ester (PGPR) or the sugar ester may provide a remarkable improvement of the chocolate in the softness and the pleasantness as well as the taste as compared to the use of the lecithin only as the emulsifying agent. Almost no difference in the improvement between the polyglycerin condensed ricinoleic acid ester (PGPR) and the sugar ester was recognized. It is preferable to use the lipophilic emulsifying agent. As another test, a hydrophilic emulsifying agent was used, thereby resulting in a remarkable increase of the viscosity of the chocolate. If amounts of the cocoa butter and the lecithin are increased to suppress the increase of the viscosity of the chocolate, then resulting in an increase of calorie of the chocolate.

b. Improvement in softness and pleasantness by use of liquid oil and fat:

The chocolate includes the cocoa butter or a substitute for the cacao butter and further milk fats. Thus, the use of the hydrogenated isomaltulose may render the chocolate tough increasingly as a time passes so that the chocolate tends to be not easily melted in the mouth. To combat this problem, liquid oil and fat was added. From the results of Examples 2A and 2B, the followings could be appreciated. Under the use of the hydrogenated isomaltulose, it is preferable to add a larger amount of the liquid oil and fat rather than the cocoa butter so that the effect of the present invention was obtained, although addition of an excess amount of the milk fat results in a milky chocolate that has a not so good taste. So if a good taste milky chocolate is required, then it is preferable to use the fresh cream or powdered fresh cream in place of the milk fat. If a good taste non-milky chocolate is required, then it is preferable to use the liquid oil and fat.

Consequently, when the use of the hydrogenated isomaltulose to produce the chocolate, then it is preferable to use the polydextrose and further to use as the emulsifying agent the lecithin and any of the lipophilic emulsifying agents other than the lecithin, for example, the polyglycerin condensed ricinoleic acid ester and the sugar ester. It is also preferable to use the liquid oil and fat, for example, the rape oil, corn oil and milk fat in place of a part of the cocoa butter.

It was considered to add the eggshell to suppress a sweetness of the chocolate. The hydrogenated isomaltulose has a small degree of the sweetness that is about 40% of the sweetness of sugar, for that reason the effect to suppress the sweetness by adding the eggshell is no remarkable. Addition of 5% of the powdered eggshell may suppress an absorption of the cocoa butter without any loss of quality of the chocolate.

2. Measurement of variations in hardness (snap property) of the chocolate by time-passing:

Fracture tests were made by use of a rheometer for every chocolates of all of the above foregoing examples and comparative examples. The measured variations in the hardness of the chocolates are illustrated on FIG. 1 and Table 2.

TABLE 2

| Time (Month) | Variation of Hardness of Chocolate | | | | | | |
|---|---|---|---|---|---|---|---|
| | 1 | 2 | 3 | 4 | 5 | 6 | 7 |
| Com. Ex. 3 | 826 | 957 | 1113 | 1293 | 1411 | 1496 | 1626 |
| Example 3 | 887 | 1011 | 1185 | 1239 | 1326 | 1439 | 1674 |
| Example 2A | 970 | 1120 | 1272 | 1391 | 1541 | 1615 | 1739 |
| Example 1A | 1109 | 1376 | 1528 | 1696 | 1765 | 1802 | 1935 |
| Com. Ex. 1 | 1185 | 1520 | 1613 | 1828 | 1946 | 1983 | 2222 |
| Com. Ex. 2 | 1250 | 1750 | 2087 | 2307 | 2278 | 2704 | 2952 |

(Unit : g by weight)

From FIG. 1 and Table 2, it could be appreciated that the improved chocolates of the present invention show a sufficient durability of a desirable low hardness namely a good snap property as compared to the chocolates of the comparative examples 1 and 2. The effect by use of the emulsifying agent appears in a last half. This means that crystals of the chocolate are prevented to grow up to a large size and further liberation of free water is prevented.

3. Animal Test:

In Example 4 and Comparative Examples 1 and 3, animal foods including the chocolates were prepared for the animal test to evaluate the absorptions thereof. SD series male rates were selected. The animal food has components that comprise 60% of the chocolate, 20% of casein, 7% of corn starch, 5% of cellulose, 6% of mineral mixtures and 2% of vitamin mixtures. The rats were placed in condition for free-intakes of the food and water. Feces of the rats were inspected thereby the followings were appreciated. Rats that has taken the foods including the chocolate of Comparative Example 1 showed a diarrhea for a few days thereafter, but this was repaired increasingly. The absorption of the fat was tested. The food of the chocolate of Example 4 may permit that absorptivities of palmitic acid (C16) and stearic acid (C18) were suppressed to 51.3% and 41.1% respectively as compared to that of Comparative Example 3 and also that an absorptivity of the fat is reduced to 65.1%. An absorptivity of testicle surrounding fats is also reduced by about 20%.

Calculations of calories of the chocolates were made on the bases of the forgoing results of the tests thereby the followings were appreciated. When the chocolate of Comparative Example 3 has 521 calories per 100 grams, then the chocolates of Comparative Example 1 and Example 4 have 419 calories per 100 grams and 299 calories per 100 grams respectively. This means that the calorie of the chocolate of Example 4 was reduced by 40% as compared to the calorie of the chocolate of Comparative Example 1.

4. Sampling Test by Panelists:

The chocolates of Example 4 and Comparative Examples 1 and 3 were sampled by twenty panelists of teen age to forty age men and women. The panelists refrained from having any breakfast and any food and drink since 10:00 p.m. on the previous day. Any one of three kinds of the chocolates was selected in random by every panelists to be sampled at 9:00 a.m. In the next week, any one of the remaining two kinds of the chocolates was sampled and then in the third week the remaining one was sampled. 50 g of the chocolate was sampled by each panelist at one time sampling. Variations of feces natures were observed, results of which are represented on Table 3.

TABLE 3

| | Variations of Feces Natures | | | |
|---|---|---|---|---|
| | Slightly Hard | No Variation | Slightly Soft | Diarrhea |
| Ex. 4 | 1 | 7 | 12 | 0 |
| Comp. 3 | 3 | 15 | 2 | 0 |
| Comp. 1 | 0 | 3 | 7 | 10 |

(Unit: the number of panelists)

Fifteen of the panelists that had taken the chocolate of Comparative Example 1 showed abdominal discomforts one to three hours after eating the chocolates. By contrast, none of the panelists that had taken the chocolate of Comparative Example 3 showed abdominal discomforts. Also five of the panelists that had taken the chocolate of Example 4 showed abdominal discomforts.

What is claimed is:

1. A chocolate including:
   a glucide that comprises a hydrogenated isomaltulose and a hygroscopic second sugar selected from the group consisting of sugar alcohols, oligosaccharides and dietary fibers, wherein a weight ratio of said isomaltulose to said sugar is in the range of from 1:0.3 to 1:3; and an emulsifying agent in an amount of not more than about 0.6% by weight, wherein said emulsifying agent comprises a lecithin in an amount of 0.2 to 0.4% by weight and a lipophilic emulsifying agent other than lecithin in an amount of 0.05 to 0.3% by weight, said lipophilic emulsifying agent being selected from the group consisting of sugar ester, glycerine fatty acid ester, and polyglycerin condensed ricinoleic ester;

wherein said chocolate is resistant to increase in hardness over time, due to presence of said hygroscopic sugar and said lipophilic emulsifying agent.

2. The chocolate as claimed in claim 1, further including at least one selected from the group consisting of calcium salts, calcium containing materials, magnesium salts and magnesium containing materials.

3. The chocolate as claimed in claim 1, wherein the sugar alcohol is selected from the group consisting of sorbitol and maltitol.

4. The chocolate as claimed in claim 1, wherein the oligosaccharide is selected from the group consisting of soybean oligosaccharide and xylooligosaccharide.

5. The chocolate as claimed in claim 1, wherein the dietary fiber is selected from the group consisting of polydextrose and a hard digestive dextrin.

6. A chocolate including:
a glucide that comprises a hydrogenated isomaltulose and a hygroscopic second sugar selected from the group consisting of sugar alcohols, oligosaccharides and dietary fibers, wherein a weight ratio of said isomaltulose to said sugar is in the range of from 1:0.3 to 1:3; and oil and fat that comprise a cacao fat and a substitute for cacao fat selected from the group consisting of fresh cream, butters, margarines, cone oils, olive oils and rape oils wherein the oil and fat have a SFI value not less than 30 at a temperature of about 20° C.; and an emulsifying agent;

wherein said chocolate is resistant to increase in hardness over time, due to presence of said hygroscopic sugar and said substitute for cacao fat.

7. The chocolate as claimed in claim 6, wherein the emulsifying agent comprises a lecithin and any of lipophilic emulsifying agents except for the lecithin.

8. The chocolate according to claim 7, wherein said lipophilic emulsifying agent is selected from the group consisting of sugar ester, glycerine fatty acid ester and polyglycerin condensed ricinoleic acid ester.

9. The chocolate as claimed in claim 6, further including at least one selected from the group consisting of calcium salts, calcium containing materials, magnesium salts and magnesium containing materials.

10. The chocolate as claimed in claim 6, wherein the sugar alcohol is selected from the group consisting of sorbitol and maltitol.

11. The chocolate as claimed in claim 6, wherein the oligosaccharide is selected from the group consisting of soybean oligosaccharide and xylooligosaccharide.

12. The chocolate as claimed in claim 6, wherein the dietary fiber is selected from the group consisting of polydextrose and a hard digestive dextrin.

13. The chocolate according to claim 7, wherein said emulsifying agent is present in an amount not more than about 0.6% by weight, including 0.2 to 0.4% by weight of said lecithin and 0.05 to 0.3% of said lipophilic emulsifying agents.

14. A chocolate including:
a glucide that comprises a hydrogenated isomaltulose and a hygroscopic second sugar selected from the group consisting of sugar alcohols, oligosaccharides and dietary fibers, wherein a weight ratio of said isomaltulose to said sugar is in the range of from 1:0.3 to 1:3;

oil and fat that comprise a cacao fat and a substitute for cacao fat selected from the group consisting of fresh cream, butters, margarines, cone oils, olive oils and rape oils wherein the oil and fat have a SFI value not less than 30 at a temperature of about 20° C.; and an emulsifying agent in an amount of nor more than about 0.6% by weight, wherein said emulsifying agent comprises a lecithin in an amount of 0.2 to 0.4% by weight and a lipophilic emulsifying agent other than lecithin in an amount of 0.05 to 0.3% by weight, said lipophilic emulsifying agent being selected from the group consisting of sugar ester, glycerine fatty acid ester, and polyglycerin condensed ricinoleic ester;

wherein said chocolate is resistant to increase in hardness over time, due to presence of said hygroscopic sugar, said lipophilic emulsifying agent, and said substitute for cacao fat.

15. The chocolate as claimed in claim 14, further including at least one of selected from the group consisting of calcium salts, calcium containing materials, magnesium salts and magnesium containing materials.

16. The chocolate as claimed in claim 14, wherein the sugar alcohol is selected from the group consisting of sorbitol and maltitol.

17. The chocolate as claimed in claim 14, wherein the oligosaccharide is selected from the group consisting of soybean oligosaccharide and xylooligosaccharide.

18. The chocolate as claimed in claim 14, wherein the dietary fiber is selected from the group consisting of polydextrose and a hard digestive dextrin.

19. The chocolate as claimed in claim 14, wherein the oil and fat further include a milk fat.

20. The chocolate according to claim 14, wherein said lipophilic emulsifying agent is selected from the group consisting of sugar ester, glycerine fatty acid ester and polyglycerin condensed ricinoleic acid ester.

* * * * *